Dec. 18, 1945. H. F. FULLER 2,390,997
HOLDER FOR ELECTRODES AND WELDING RODS
Filed Sept. 12, 1944 2 Sheets-Sheet 1
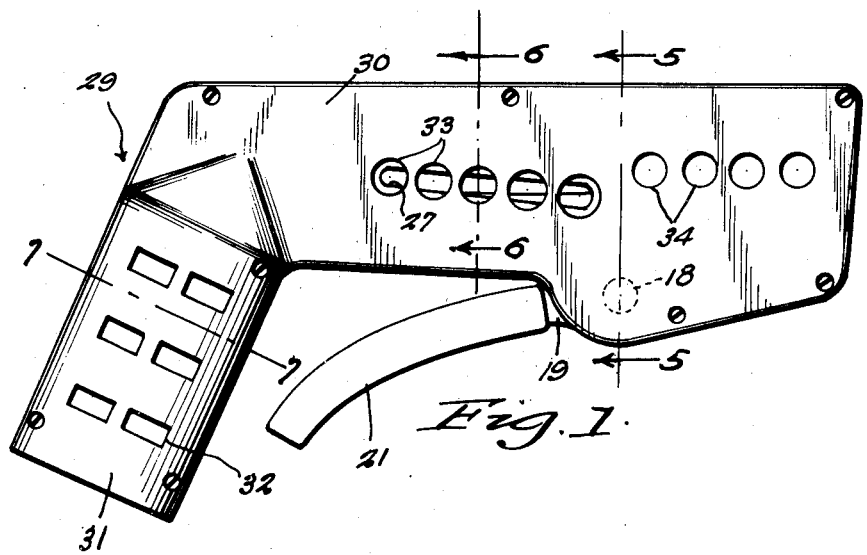
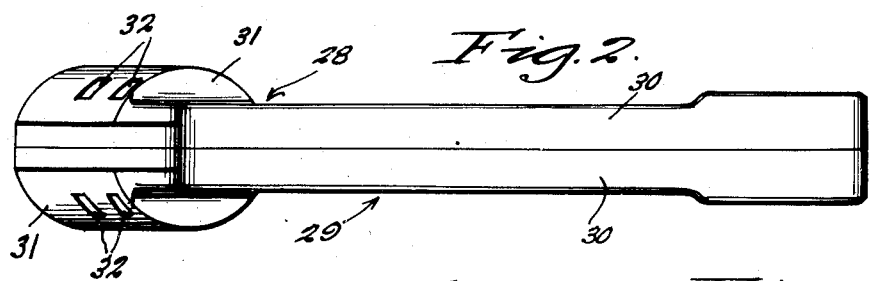
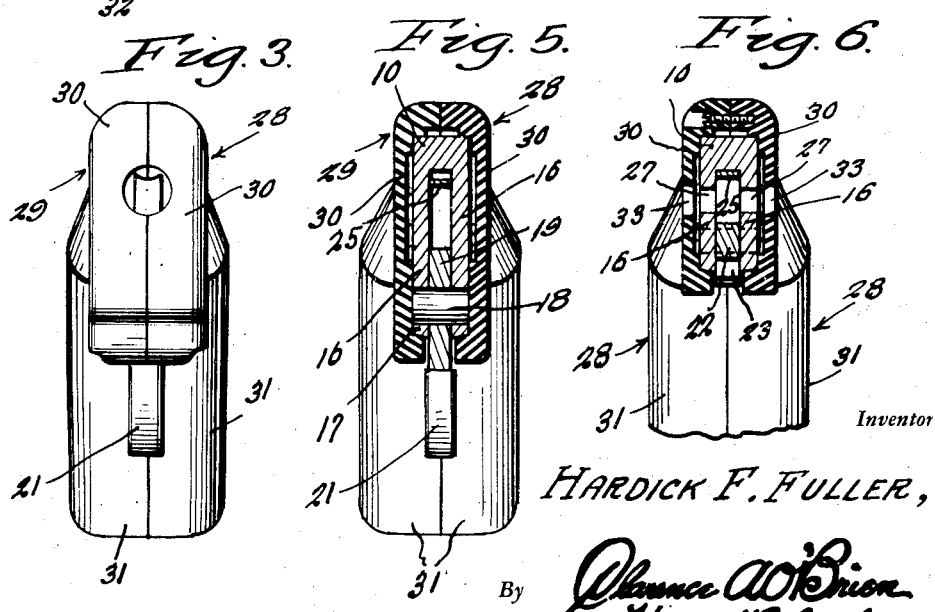
Inventor
HARDICK F. FULLER,

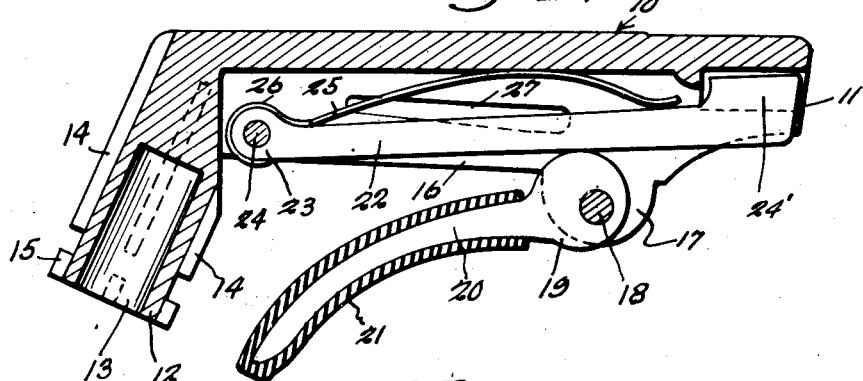
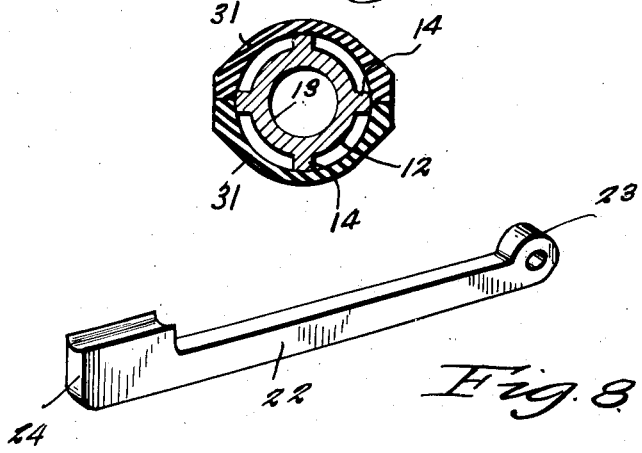
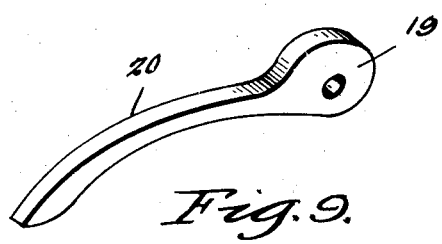

Patented Dec. 18, 1945

2,390,997

UNITED STATES PATENT OFFICE 2,390,997

HOLDER FOR ELECTRODES AND WELDING RODS

Hardick F. Fuller, Portland, Oreg.

Application September 12, 1944, Serial No. 553,737

8 Claims. (Cl. 219—8)

This invention relates to a structurally distinct, novel and improved piston-shaped holder for welding rods and electrodes, the same having reference in particular to a so-called "electromechanical" holder expressly designed to perform the double purpose of securely and adjustably holding the electrode and also supplying the electric current thereto.

By way of introduction it is to be pointed out that the device herein disclosed and described and claimed bears considerable structural and functional resemblance to a similar electrode holder covered in my co-pending application Serial No. 485,632 of May 4, 1943, which matured into Patent No. 2,358,800, dated September 26, 1944.

The electrode holder mentioned in the preceding paragraph is of the pistol-grip type as is the present device, whereby to permit it to be rapidly and conveniently operated in an advantageous manner in places often not accessible when using other forms and styles of holders.

The structural adaptation covered herein is characterized by ways-and-means to properly and electrically insulate, this in a manner to avoid burns and injuries from flashes and arcs.

A further object of the invention has to do with the provision of a simple and economical structural arrangement which is effective and reliable, adaptable to the accommodation of electrodes or rods of different diameters and otherwise accommodating to perform the desired results with requisite ease and expediency in handling.

My primary aim is, of course, to improve upon the aforementioned electrode holder, this through the instrumentality of a structure characterized by a sectional insulated shell which houses an especially designed and constructed core member, the latter characterized by a sheath-like unit having a socket at one end and having a flanged receptacle portion or shank at the other end, the latter serving to accommodate a lever-equipped cam, and a spring-pressed jaw member.

Other features and advantages will become more readily apparent from the following description and the accompanying illustrative drawings.

In the drawings—

Figure 1 is a side elevational view of a welding rod or electrode-holder constructed in accordance with the specific principles of the present invention.

Figure 2 is a top plan or edge elevational view of the arrangement depicted in Figure 1.

Figure 3 is a front end elevation, that is, an elevational view of Figure 1 observing the same in a direction from right to left.

Figure 4 is a central longitudinal sectional and elevational view of the enclosed inner sheath-like unit and parts incorporated therein.

Figures 5 and 6 are transverse sections on the lines 5—5 and 6—6, respectively, of Figure 1, looking in the direction of the arrows.

Figure 7 is a cross section on the plane of the line 7—7 of Figure 1.

Figures 8 and 9 are perspective views of certain of the details.

Referring first to Figure 4, it will be seen that the inner enclosed or core device is in the form of a sheath-like metal unit and this is characterized by an elongated shank portion 10 having its right-hand or outer end fashioned into a suitable stationary jaw 11. The opposite end is laterally directed as at 12 and provided with a socket 13 to accommodate a lead-in (not shown). The part 12 is provided with radially outstanding circumferentially spaced ribs 14 and 15 suitably arranged to serve as spacing and aerating elements. The shank portion is recessed to define a chamber having side wall flanges 16. The intermediate portions of the flanges are provided with extensions constituting ears 17 to accommodate a hinge pin 18 forming an eccentric pivotal connection for the cam 19, the latter occupying a position between the ears. The cam 19 is provided with a trip handle 20 with a protective covering 21 of suitable insulation material.

The numeral 22 designates a lever which is formed with an eye 23 at its inner end, this hinged at 24 in the adjacent or inner end of the recess. The outer end of the lever is fashioned into a grooved head 24' which operates in the jaw portion 11 and constitutes a relatively movable electrode gripping jaw. The cam 19 acts on the adjacent edge portion of the lever 22. A flat spring 25 has its free end bearing on the inner edge portion of the lever adjacent the jaw 24' and has its opposite end portion 26 coiled around the eye 23 for anchorage purposes. The numeral 27 designates ventilating slots in the flanges 16.

The sheath-like core unit or device 10 is housed in an enclosing jacket of insulation, this made up of complemental duplicate half sections 28 and 29. The elongated or horizontal portions 30 are fashioned to embrace and enclose the ears 17, the flanges 16, the movable jaw-lever 22 and the entire sheath portion. The portions 31 are fashioned to embrace the socketed end portion 12 and sufficient clearance is provided, by the spacing ribs 14 and 15, to completely ventilate this part of the structure. In fact, these portions 31 are provided with a plurality of ventilating apertures 32. The portions 30 are also provided with ventilating holes 33 registering with the aforementioned slot 27 and auxiliary holes 34 associated with the stationary and movable jaws.

As before stated, the device resembles a pistol in general appearance and the trigger 20 is located adjacent the hand-grip where it can be conveniently manipulated in an obvious manner.

The device herein shown and described is susceptible of holding almost any size welding rod manufactured, this by use of the novel cam actuated jaw-gripping means. The structure is such that it will not overheat, will not break the supply of current, and it is designed to function properly in any position due to its balanced construction. In other words, it is balanced like a pistol and used accordingly and is light in weight and has a positive grip on the rod and the lead-in will follow in line and will not kink or break. There are many different styles and types of welding electrode holders in use and they often burn out rapidly and have to be discarded. This is, obviously, a time-consuming reality. As a matter of fact, much time is lost due to overheating during which period the welder must lay aside the holder in order to enable it to cool off.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. As a new article of manufacture and as a component part of an electrode holder of the class described, a sheath-like metal unit including slotted parallel side flanges, said flanges having spaced parallel ears, the flanges being fashioned at one end into a stationary jaw, a cylindrical lateral extension at the opposite end of the unit formed with a socket and external spacing ribs, a lever pivoted between said flanges and having a headed portion constituting a movable jaw coacting with the first-named jaw, a cam eccentrically pivoted between said ears and provided with an outstanding operating handle, and a flat spring having its free end portion bearing against an adjacent end portion of said lever, its intermediate portion bearing against the sheath and its opposite end coiled around the pivoted end of said lever.

2. As a new article of manufacture and as a component part of an electrode-holder of the class described, an all-metal sheath-like unit comprising a longitudinal shank portion forming the sheath proper and including spaced parallel slotted side flanges having its outer end fashioned into a stationary electrode accommodating jaw, the opposite end of said unit being formed with a lateral cylindrical extension provided with a socket to accommodate a lead-in and provided on its exterior with radial circumferentially spaced spacing ribs, a lever having an eye at its inner end pivoted in the sheath between the side flanges, the lever being provided at its free end with a laterally projecting grooved head constituting a movable jaw and coacting with the first-named jaw, a flat spring having one end coiled around said eye, its intermediate portion bearing against the adjacent part of the sheath and its free end portion bearing against the adjacent outer end portion of said lever, said flanges being provided with outstanding parallel ears, and a cam eccentrically pivoted between said ears and provided with an operating handle, said cam being engageable with the adjacent edge portion of said lever in the manner and for the purposes described.

3. As a new article of manufacture and as a component part of an electrode holder of the class described, a one-piece sheath-like core unit including a rectilinear body having slotted parallel side flanges, said flanges having a pair of projecting spaced parallel ears, said flanges being fashioned at one end into a stationary jaw, a cylindrical lateral extension at the opposite end of the body, this formed with a socket and external jacket spacing ribs, a lever confined and pivoted between said flanges and having a headed free end portion constituting a movable jaw coacting with the first-named jaw, a cam eccentrically pivoted between said ears and provided with an outstanding operating handle, a sectional insulated core-enveloping jacket enclosing and completely housing said core unit, the complemental sections thereof fitting together and around said unit and conforming in outline to the coacting body and extension portion of the unit to provide a substantially pistol-shaped holder, and said sections being provided with a plurality of ventilating apertures, these coacting with the slots in said flanges and ribs for unifromally ventilating the core unit and minimizing the possibility of over-heating or burning the user's hands.

4. As a new article of manufacture and as a component part of an electrode-holder of the class described, an all-metal sheath-like unit comprising a longitudinal shank portion forming the sheath proper and including spaced parallel soltted side flanges having its outer end fashioned into a stationary electrode accommodating jaw, the opposite end of said unit being formed with a lateral cylindrical extension provided with a socket to accommodate a lead-in and provided on its exterior with radial circumferentially spaced ribs, a lever having an eye at its inner end pivoted in the sheath between the side flanges, the lever being provided at its free end with a laterally projecting grooved head constituting a movable jaw and coacting with the first-named jaw, said flanges being provided with outstanding parallel ears, and a cam eccentrically pivoted between said ears and provided with an operating handle said cam being engageable with the adjacent edge portion of said lever in the manner and for the purposes described.

5. As a new article of manufacture and as a component part of an electrode holder of the class described, a sheath-like metal unit including parallel side flanges, said flanges having spaced parallel ears and being fashioned at co-acting corresponding ends into a stationary jaw, a lateral extension at the opposite end of the unit formed with a socket, a lever pivoted between said flanges and having a headed swingable end portion constituting a movable jaw co-acting with the first-named jaw, a cam eccentrically pivoted between said ears and provided with an outstanding operating handle, and spring means for biasing said jaws apart.

6. As a new article of manufacture and as a component part of an electrode-holder of the class described, an all-metal sheath-like unit comprising a longitudinal shank portion forming the sheath proper and including spaced parallel side flanges having its outer end fashioned into a stationary electrode accommodating and retaining jaw, the opposite end of said unit being formed with a lateral cylindrical extension provided with a socket to accommodate a lead-in, a lever having an eye at its inner end pivoted in the sheath between the side flanges, the lever constituting a movable jaw and co-acting with the first-named jaw, and spring means for biasing said jaws apart having one end coiled around said eye, its intermediate portion bearing against an adjacent part of the sheath and its free end portion bearing against the adjacent outer end portion of said lever, said flanges being provided with outstanding parallel ears, and a cam eccentrically pivoted between said ears and provided with an operating handle, said cam being engageable with the adjacent edge portion of said lever in the manner and for the purposes described.

7. As a new article of manufacture and as a component part of an electrode holder of the class described, a one-piece sheath-like core unit including a rectilinear body having slotted parallel side flanges, said flanges having a pair of projecting spaced parallel ears, said flanges being fashioned at one end into a stationary jaw, a cylindrical lateral extension at the opposite end of the body, this formed with a socket, a lever confined and pivoted between said flanges and having a headed free end portion constituting a movable jaw coacting with the first-named jaw, a cam eccentrically pivoted between said ears and provided with an outstanding insulated operating handle, a sectional insulated core-enveloping jacket enclosing and completely housing said core unit, the complemental sections thereof fitting together and around said unit and conforming in outline to the co-acting body and extension portion of the unit to provide a substantially pistol-shaped holder, and said sections being provided with a plurality of ventilating apertures.

8. As a new article of manufacture and as a component part of an electrode-holder of the class described, an all-metal sheath-like unit comprising a longitudinal shank portion forming the sheath proper and including spaced parallel slotted side flanges, said unit having its outer end fashioned into a stationary electrode accommodating jaw, means on the opposite end of said unit for attaching a lead thereto, a lever pivoted at one end in the sheath between the side flanges, the lever being provided at its free end with a jaw for co-acting with the first-named jaw, said flanges being provided with outstanding parallel ears, and a cam eccentrically pivoted between said ears and provided with an operating handle said cam being engageable with the adjacent edge portion of said lever in the manner and for the purposes described.

HARDICK F. FULLER.